Sept. 27, 1949.    R. B. COTTRELL    2,483,360
SPRING GROUP
Filed June 23, 1944    2 Sheets-Sheet 1
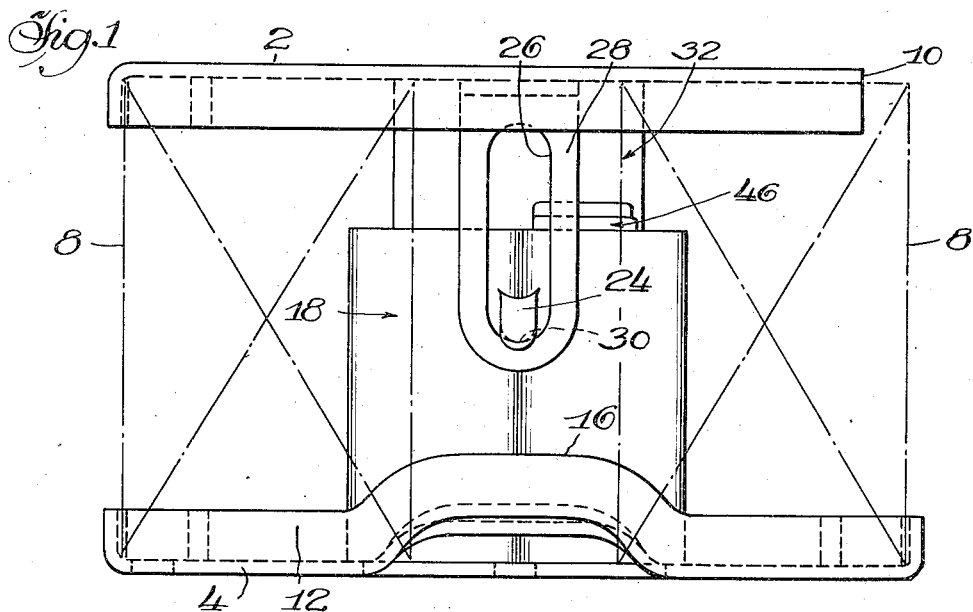
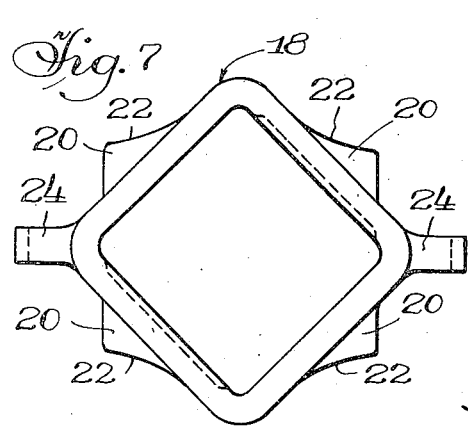
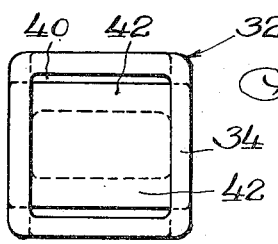
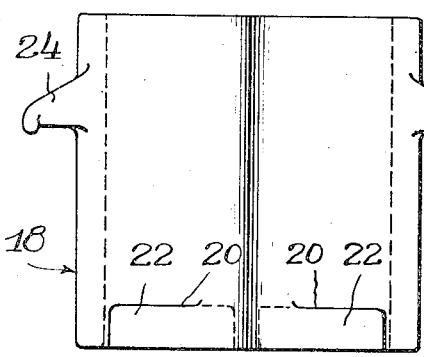
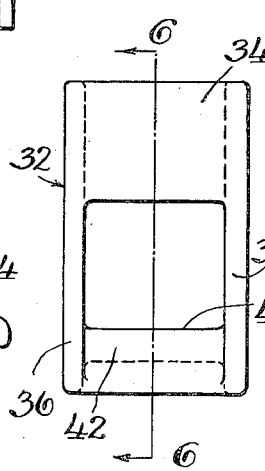
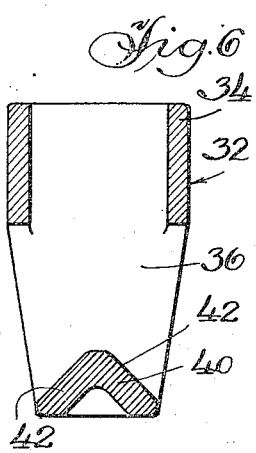
INVENTOR.
Robert B. Cottrell
BY
Atty.

Sept. 27, 1949.  R. B. COTTRELL  2,483,360
SPRING GROUP
Filed June 23, 1944  2 Sheets-Sheet 2

INVENTOR.
Robert B. Cottrell

Patented Sept. 27, 1949

2,483,360

UNITED STATES PATENT OFFICE 2,483,360

SPRING GROUP

Robert B. Cottrell, Chicago, Ill., assignor to American Steel Foundries, Chicago, Ill., a corporation of New Jersey Application June 23, 1944, Serial No. 541,762

15 Claims. (Cl. 267—9)

My invention relates to a spring group particularly designed for use in a railway car truck to afford resilient support for the truck bolster from the side frame.

The general object of my invention is to design a spring group of the above type in which friction means is provided for dampening oscillations of the bolster supporting springs, thus preventing harmonious oscillation thereof and resultant damage to truck parts and lading.

A specific object of my invention is to provide a friction device disposed centrally of a four coil spring group, said device including novel positioning means for the respective springs and comprising interlocking means for limiting the expansion or release stroke of the group.

My novel friction device comprises a friction housing secured to one of the spring plates and a follower secured to the other thereof, said follower presenting converging wedge faces within the housing for engagement with friction shoes therein, a spring being housed within the follower and seated against the shoes and said other plate.

My invention comprehends a novel arrangement wherein the follower comprises means engageable with the shoes during sudden closure or compression of the spring group to prevent overcompression of the above-described shoe actuating spring.

My invention includes a novel form of friction housing of substantially rectangular shape, said housing being formed at the base thereof with an external spring positioning lug on each side thereof for cooperation with an adjacent spring of the associated group, and on two oppositely disposed corners of my novel housing are formed external interlocking lugs formed and arranged for slidable interlock with associated means for limiting expansion of the spring group.

In the drawings,

Figure 1 is a side elevation of a spring group embodying my invention.

Figure 2:
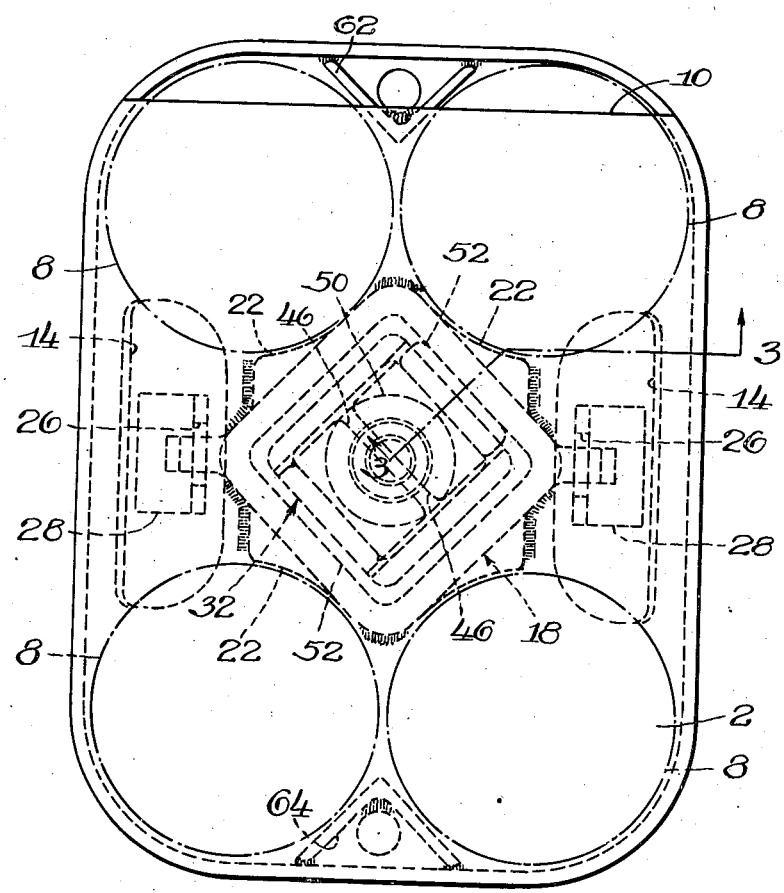
Figure 2 is a top plan view of said group.

Figures 4–6 inclusive illustrate in detail the novel friction follower shown in the above-mentioned figures, Figure 4 being a top plan view of the follower, Figure 5 being a side elevation thereof, and Figure 6 being a sectional view taken in the plane indicated by the line 6—6 of Figure 5.

Figures 7 and 8 illustrate in detail my novel friction housing, Figure 7 being a top plan view thereof, and Figure 8 being a side elevation thereof.

Describing my invention in detail, the spring group comprises top and bottom plates 2 and 4 adapted for engagement respectively with the bolster and side frame of a railway car truck (not shown). The top plate 2 is provided with the inturned flange 6 affording convenient positioning means for the four coil springs 8, 8 disposed between the spring plates, said plate 2 being cut off as at 10 at its rear extremity to avoid interference with the truck bolster (not shown). The bottom plate 4 is similarly formed with the inturned spring positioning flange 12, and it may be noted that at each side thereof the bottom plate 4 is slotted as at 14 and is upwardly offset as at 16 to afford clearance for the truss member (not shown) of a well known type of side frame commonly designated "double truss."

Centrally disposed with respect to the springs 8, 8 is my novel friction device comprising a friction housing 18, shown in some detail in Figures 7 and 8, said housing being an approximately square shaped hollow member with an external lug 20 formed on each side thereof at the base thereof, each of said lugs being provided with an arcuate spring positioning surface 22 for cooperation with the adjacent spring 8, as best seen in Figure 2 wherein it will be noted that each corner of the housing 18 extends between two of the springs 8, 8, thereby affording convenient positioning means therefor. At opposite corners thereof, the housing 18 is formed with a pair of hook-like interlocking lugs 24, 24, each of said lugs being adapted for reciprocation within an opening 26 of a strap 28 secured in any convenient manner, as by welding, to the top plate 2. It will be apparent to those skilled in the art that each lug 24 engages the lower extremity of the slot 26 as at 30 (Figure 1) to limit expansion of the spring group and to thereby maintain the various elements thereof in assembled relationship under service conditions.

A follower generally designated 32 is secured in any convenient manner, as by welding, to the top plate 2, said follower comprising a substantially square section hollow wall 34 at its upper extremity for convenient housing of the associated shoe actuating spring, as hereinafter more particularly described, and integrally formed with the wall 34 at its lower extremity is a yoke-like portion defined by the spaced depending walls 36 and 38 at their lower extremities by a substantially V-section web 40 formed at opposite sides thereof with the converging wedge faces 42, 42, each being formed and arranged for complementary wedge engagement as at 44 (Figure 3) with a friction shoe generally designated 46.

Each shoe 46 is a substantially solid member with a recess 48 in the upper extremity thereof affording a seat for the shoe actuating spring 50 which is compressed between the shoes 46, 46 and the top spring plate 2.

The spring 50, as shown in Figure 2, may comprise a plurality of telescoped coil springs, and it will be understood that if desired, the spring 50 may be a single resilient member.

Figure 3:
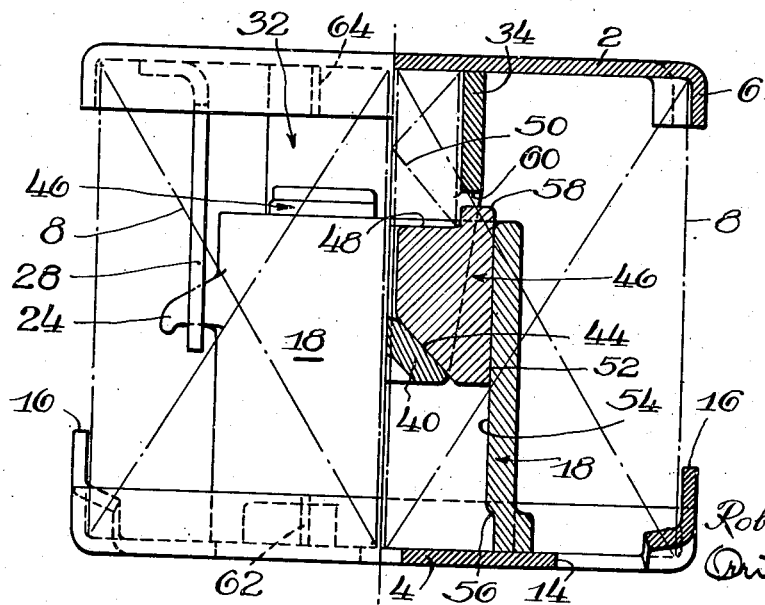
Figure 3 is an end elevation of the structure shown in Figures 1 and 2 with the right half of Figure 3 being a sectional view taken in the planes indicated by the line 3—3 of Figure 2.

Each friction shoe, as best seen in the right half of Figure 3, is in slidable frictional engagement as at 52 with a friction surface 54 formed within the friction housing 18, said surface being relieved as at 56 adjacent its lower extremity to prevent the formation of a shoulder thereon, as will be clearly understood by those skilled in the art. It will also be seen, in the right half of Figure 3, that the upper extremity 58 of each friction shoe 46 is formed with a flat face for convenient abutment with the flat lower extremity 60 of the wall 34 under conditions wherein the spring group is compressed suddenly. It will be understood that under such conditions, the shoes 46, 46 may occasionally be lifted from the wedge surfaces 42, 42 and may tend to overcompress their actuating spring 50 unless some suitable means is provided for limiting compression thereof. This function is accomplished by abutment of the lower extremity 60 of the wall 34 with the upper extremity 58 of each shoe under these unusual conditions, and it will be apparent that by this means overcompression of the spring 50 is effectively prevented.

At each end of the bottom plate 4, a V-shaped spring positioning member 62 is secured in any convenient manner, as by welding, the apex of said member projecting between the adjacent springs 8, 8 in opposition to the adjacent corner of the friction housing 18. In this manner these springs are conveniently confined between the member 62, the housing 18, and the adjacent portions of the flange 12; and likewise, at the forward extremity thereof, the top plate 2 is provided with a V-shaped spring positioning member 64 secured thereto as by welding and disposed with its apex in opposition to the adjacent corner of the housing 8, thereby conveniently confining the outboard springs 8, 8.

It will be readily apparent from a consideration of Figure 2, that the wall 34 of the top follower 32, which houses the shoe actuating spring 50, is spaced from the interior surfaces of the friction housing 18, thus permitting a limited amount of relative movement between the plates 2 and 4 resisted by friction developed at 44 or 52 (Figure 3). This limited movement prevents breakage of the various parts of the device and, at the same time, affords limited frictional control of relative movement between the plates 2 and 4, as will be clearly understood by those skilled in the art.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a spring group, top and bottom spring plates, a plurality of coil springs therebetween, and a friction device disposed centrally of said group, said device comprising a substantially square friction housing having a lug on each side thereof welded to the bottom plate and comprising an arcuate surface affording positioning means for the adjacent spring, each corner of said housing projecting between two of said springs, arcuate inturned spring positioning flanges on said plates, at least one V-shaped member welded to each plate and having the apex of said V opposed to the adjacent corner of said housing and extending between adjacent springs for positioning the same, a follower welded to the top plate and extending into said housing, said follower presenting converging wedge faces, friction shoes within said housing and each engaging one of said faces and an adjacent surface of said housing, precompressed spring means housed within said follower in abutment with said shoes and said top plate, and means on said top plate slidably interlocked with external means formed on opposite corners of said housing for limiting the expansion stroke of said group.

2. In a spring group, top and bottom spring plates, a plurality of coil springs therebetween, and a friction device disposed centrally of said group, said device comprising a substantially square friction housing having a lug on each side thereof welded to the bottom plate and comprising an arcuate surface affording positioning means for the adjacent spring, each corner of said housing projecting between two of said springs, arcuate inturned spring positioning flanges on said plates, at least one V-shaped member welded to each plate and having the apex of said V opposed to the adjacent corner of said housing and extending between adjacent springs for positioning the same, a follower welded to the top plate and extending into said housing, said follower presenting converging wedge faces, friction shoes within said housing and each engaging one of said faces and an adjacent surface of said housing, precompressed spring means housed within said follower in abutment with said shoes and said top plate, and means on said follower engageable with said shoes during sudden compression of said group for limiting compression of said spring means.

3. In a spring group, top and bottom spring plates, a plurality of coil springs therebetween, and a friction device disposed centrally of said group, said device comprising a substantially square friction housing having a lug on each side thereof welded to the bottom plate and comprising an arcuate surface affording positioning means for the adjacent spring, each corner of said housing projecting between two of said springs, arcuate inturned spring positioning flanges on said plates, at least one V-shaped member welded to each plate and having the apex of said V opposed to the adjacent corner of said housing and extending between adjacent springs for positioning the same, a follower welded to the top plate and extending into said housing, said follower presenting converging wedge faces, friction shoes within said housing and each engaging one of said faces and an adjacent surface of said housing, and precompressed spring means housed within said follower in abutment with said shoes and said top plate, said follower being spaced from the internal surfaces of said housing to afford limited relative movement between said plates.

4. In a spring group, top and bottom spring plates, a plurality of coil springs therebetween, and a friction device disposed centrally of said group, said device comprising a substantially square friction housing having a lug on each side thereof welded to the bottom plate and comprising an arcuate surface affording positioning means for the adjacent spring, each corner of said housing projecting between two of said springs, arcuate inturned spring positioning flanges on said plates, a V-shaped member welded to each plate and having the apex of said V opposed to the adjacent corner of said housing and extending between adjacent springs for positioning the same, a follower welded to the top plate and extending into said housing, said follower presenting converging wedge faces, friction shoes within said housing and each engaging one of said faces and an adjacent surface of said housing, and precompressed spring means housed within said follower in abutment with said shoes and said top plate.

5. In a spring group, top and bottom spring plates, four coil springs therebetween, and a friction device disposed centrally of said springs in parallel therewith, said device comprising a substantially square hollow friction housing secured to one of said plates and having each corner thereof projecting between two of said springs to afford positioning means therefor, a follower secured to the other plate and extending into said housing, said follower comprising a yoke-like portion with converging wedge surfaces, friction shoes within said housing engaging friction surfaces therewithin and engaging respective wedge surfaces, a compressed spring housed within said follower and seated against said shoes and said other plate, and straps on said other plate depending therefrom, each of said straps having a slot receiving a lug formed on the adjacent corner of said housing, said lugs being engageable with the bottom of said slots to limit the expansion stroke of the group.

6. In a spring group, top and bottom spring plates, four coil springs therebetween, and a friction device disposed centrally of said springs in parallel therewith, said device comprising a substantially square hollow friction housing secured to one of said plates and having each corner thereof projecting between two of said springs to afford positioning means therefor, a follower secured to the other plate and extending into said housing, said follower comprising a yoke-like portion with converging wedge surfaces, friction shoes within said housing engaging friction surfaces therewithin and engaging respective wedge surfaces, and a compressed spring housed within said follower and seated against said shoes and said other plate, said yoke being spaced a substantial distance from the interior surfaces of said housing to permit limited longitudinal, lateral and torsional movement between said plates.

7. In a spring group, top and bottom spring plates, four coil springs therebetween, and a friction device disposed centrally of said springs in parallel therewith, said device comprising a substantially square hollow friction housing secured to one of said plates and having each corner thereof projecting between two of said springs to afford positioning means therefor, a follower secured to the other plate and extending into said housing, said follower comprising a yoke-like portion with converging wedge surfaces, friction shoes within said housing engaging friction surfaces therewithin and engaging respective wedge surfaces, a compressed spring housed within said follower and seated against said shoes and said other plate, and means on one of said plates slidably interlocked with means movable with the other thereof for limiting expansion of said group.

8. In a spring group, top and bottom spring plates, a plurality of coil springs confined therebetween, a friction device between said plates and disposed centrally of said springs, said device comprising a friction housing secured to one of said plates and a follower secured to the other of said plates, said follower presenting wedge means within said housing, friction elements engageable with respective wedge means and in frictional engagement with interior surfaces of said housing, resilient means housed within said follower under compression between and bearing against said shoes and said other plate, and rigid means on said follower normally spaced from said shoes and engageable therewith for actuation thereof during sudden compression of said group, said follower being entirely spaced therearound from said housing to afford longitudinal, lateral and torsional movement between said plates.

9. In a spring group, top and bottom spring plates, four coil springs therebetween, and a friction device disposed centrally of said springs in parallel therewith, said device comprising a substantially square hollow friction housing secured to one of said plates and having each corner thereof projecting between two of said springs to afford positioning means therefor, a follower secured to the other plate and extending into said housing, said follower comprising a yoke-like portion with converging wedge surfaces, friction shoes within said housing engaging friction surfaces therewithin and engaging respective wedge surfaces, and a compressed spring housed within said follower and seated against said shoes and said other plate.

10. In a spring group, top and bottom plates, for coil springs therebetween, a friction housing secured to one of said plates centrally of said group and comprising positioning means for each of said springs, a follower secured to the other plate and comprising a yoke presenting wedge faces within said housing, friction shoes housed within said yoke in engagement with respective faces and in frictional engagement with internal friction surfaces of said housing, and resilient means compressed between said shoes and said other plate, said yoke affording a housing for said resilient means and being substantially spaced from the interior surfaces of said housing to permit limited longitudinal, lateral and torsional movement between said plates.

11. In a spring group, top and bottom plates, four coil springs therebetween, a friction housing secured to one of said plates centrally of said group and comprising positioning means for each of said springs and having a substantially square opening therein, a substantially rectangular yoke-like follower secured to the other plate and projecting into said opening in spaced relation to the internal surfaces of said housing to accommodate longitudinal, lateral and torsional movement between said plates and presenting wedge faces within said housing, spaced friction shoes housed within said follower in engagement with respective faces and in frictional engagement with opposed internal friction surfaces of said housing, and resilient means compressed between said shoes and said other plate, said follower comprising rigid means engageable with said shoes for actuation thereof during sudden compression of said group.

12. In a spring group, top and bottom plates, four coil springs therebetween, a four-sided friction housing secured to one of said plates centrally of said group and having each corner thereof projecting between two of the springs to position the same and comprising on each side thereof other positioning means for each of said springs, a yokelike follower secured to the other plate and presenting wedge faces within said housing, friction shoes housed within said follower in engagement with respective faces and in frictional engagement with internal friction surfaces of said housing, and resilient means compressed between and bearing against said shoes and said other plate, said resilient means being housed within said follower.

13. In a spring group, top and bottom spring plates, a plurality of coil springs confined therebetween, a friction device between said plates and disposed centrally of said springs, said device comprising a substantially square friction housing secured to one of said plates and having each corner thereof projecting between two of said springs to position the same, a follower secured to the other of said plates, said follower presenting wedge means within said housing, friction elements engageable with respective wedge means and in frictional engagement with interior surfaces of said housing, and resilient means housed within said follower under compression between said elements and said other plate.

14. In a spring group, top and bottom plates, four coil springs therebetween, a friction housing secured to one of said plates centrally of said group and comprising positioning means for each of said springs and presenting a plurality of angularly related internal surfaces, a follower secured to the other plate and presenting wedge faces within said housing, friction shoes housed within said follower in engagement with respective faces and in frictional engagement with internal friction surfaces of said housing, and resilient means compressed between said shoes and said other plate, said follower being normally spaced therearound from said housing to accommodate limited longitudinal, lateral, torsional and canting movement between said plates.

15. In a spring group, top and bottom spring plates, four coil springs therebetween, and a friction device disposed centrally of said springs in parallel therewith, said device comprising a substantially square hollow friction housing secured to one of said plates and having each corner thereof projecting between two of said springs to afford positioning means therefor, a follower secured to the other plate and extending into said housing, said follower comprising a yokelike portion with converging wedge surfaces, friction shoes within said housing engaging friction surfaces therewithin and engaging respective wedge surfaces, and a compressed spring housed within said follower and seated against said shoes and said other plate, said follower comprising rigid means engageable with said shoes for actuation thereof and for limiting compression of said last-mentioned spring during sudden compression of said group.

ROBERT B. COTTRELL.

REFERENCES CITED

The following references are of record in the file of this patent:

UNITED STATES PATENTS

| Number | Name | Date |
|---|---|---|
| 499,338 | Godley | June 13, 1893 |
| 1,169,862 | Peycke | Feb. 1, 1916 |
| 1,169,863 | Peycke | Feb. 1, 1916 |
| 1,301,946 | Johnson | Apr. 29, 1919 |
| 1,795,719 | Hardison | Mar. 10, 1931 |
| 1,809,908 | Olander | June 16, 1931 |
| 1,923,894 | Sproul | Aug. 22, 1933 |
| 2,011,773 | O'Connor | Aug. 20, 1935 |
| 2,059,503 | Webb | Nov. 3, 1936 |
| 2,118,006 | Couch | May 17, 1938 |
| 2,295,556 | Flesch | Sept. 15, 1942 |
| 2,382,563 | Haseltine | Aug. 14, 1945 |